United States Patent
Afzali-Ardakani et al.

[11] Patent Number: 5,176,947
[45] Date of Patent: Jan. 5, 1993

[54] ELECTROEROSION PRINTING PLATES

[75] Inventors: Ali Afzali-Ardakani, Yorktown Heights; Mukesh K. Desai, Fishkill; Jahn P. Hoekstra, Carmel; Keith S. Pennington, Somers; Eva E. Simonyi, Bronx, all of N.Y.

[73] Assignee: International Business Machines Corporation, Armonk, N.Y.

[21] Appl. No.: 624,003

[22] Filed: Dec. 7, 1990

[51] Int. Cl.$^5$ .............................................. B32B 3/00
[52] U.S. Cl. .................................... 428/195; 428/207; 428/209; 428/327; 428/331; 428/457; 346/76 PH; 346/135.1; 346/162; 346/163
[58] Field of Search ............... 428/207, 209, 327, 331, 428/457, 195; 346/76 PH, 135.1, 162, 163

[56] References Cited

U.S. PATENT DOCUMENTS

| | | |
|---|---|---|
| 1,638,273 | 8/1927 | Pace . |
| 2,008,733 | 7/1935 | Tosterud ................................ 148/6 |
| 2,234,206 | 3/1941 | Thompson ............................ 148/6 |
| 2,312,855 | 3/1943 | Thompson ............................ 148/6 |
| 2,465,247 | 3/1949 | McBride ........................... 148/6.16 |
| 2,664,399 | 12/1953 | Kluender ............................. 252/18 |
| 2,702,768 | 2/1955 | Hyams et al. ...................... 148/6.15 |
| 2,731,354 | 1/1956 | Wirshing ............................. 106/14 |
| 2,743,205 | 4/1956 | Condon ............................ 148/6.15 |
| 3,565,699 | 2/1971 | Plaxton ............................. 148/6.16 |
| 3,725,137 | 4/1973 | Boose et al. ....................... 148/6.2 |
| 3,945,899 | 3/1976 | Nikado et al. ...................... 204/181 |
| 3,983,564 | 9/1976 | Nakazawa .............................. 346/1 |
| 4,082,902 | 4/1978 | Suzuki et al. ....................... 428/457 |
| 4,172,177 | 10/1979 | Sato ................................... 428/413 |
| 4,264,706 | 4/1981 | Sutton ................................ 430/274 |
| 4,266,988 | 5/1981 | Krippes ............................ 148/6.21 |
| 4,286,048 | 8/1981 | Merrill et al. ..................... 430/284 |
| 4,371,879 | 2/1983 | Höhn et al. ....................... 346/135.1 |
| 4,400,706 | 8/1983 | Takemura et al. ............... 346/135.1 |
| 4,427,766 | 1/1984 | Mohr ................................. 430/525 |
| 4,439,485 | 3/1984 | Takemura et al. ................. 428/323 |
| 4,465,738 | 8/1984 | Chang ............................... 428/426 |
| 4,521,463 | 6/1985 | Powers et al. ...................... 427/435 |
| 4,554,562 | 11/1985 | Afzali-Ardakani et al. ..... 346/135.1 |
| 4,565,759 | 1/1986 | Tsutsui .................................. 430/66 |
| 4,567,490 | 1/1986 | Afzali-Ardakani et al. ..... 346/135.1 |
| 4,568,621 | 2/1986 | Aviram et al. .......................... 430/5 |
| 4,596,733 | 6/1986 | Cohen et al. ....................... 428/209 |
| 4,604,341 | 8/1986 | Mohr ................................. 430/278 |
| 4,606,937 | 8/1986 | Rossler et al. ..................... 427/121 |
| 4,606,975 | 8/1986 | Mohr ................................. 428/469 |
| 4,617,579 | 10/1986 | Sachdev .......................... 346/135.1 |
| 4,622,262 | 11/1986 | Cohen ............................... 428/219 |
| 4,689,272 | 8/1987 | Simon et al. ....................... 428/448 |
| 4,707,433 | 11/1987 | Ogawa .............................. 430/289 |
| 4,810,628 | 3/1989 | Schranz et al. ..................... 430/617 |
| 4,830,909 | 5/1989 | Cohen et al. ....................... 428/331 |
| 4,915,519 | 4/1990 | Afzali-Ardakani ................ 428/209 |

FOREIGN PATENT DOCUMENTS

| | | | |
|---|---|---|---|
| 0147624 | 10/1985 | European Pat. Off. ................ 148/6 |
| 0147642 | 10/1985 | European Pat. Off. ................ 148/6 |

OTHER PUBLICATIONS

Surface Treatment and Finishing of Aluminum and its Alloys, Wernick and Pinner, 1956.

*Primary Examiner*—Patrick J. Ryan
*Assistant Examiner*—Elizabeth Evans
*Attorney, Agent, or Firm*—Ratner & Prestia

[57] ABSTRACT

Improved electroerosion recording media can be prepared by utilizing, on top of a polyester, paper, or metal substrate, a polyvinylbutyral polymer cross-linked with a mixed phenol-tert-butylphenol formaldehyde cross-linking agent as a base layer, and an erodible metallic layer sufficiently thin to be erodible in response to current pulses delivered by a stylus of an electroerosion printer. In a preferred embodiment, the polymeric layer further contains silica. The recording medium may also be top coated with a lubricating agent. The formulation provides excellent adhesion of the conductive layer, and allows the thickness of the aluminum to be increased up to 75%, resulting in an optical density (with aluminum as the metallic layer) of up to 3.5.

11 Claims, 1 Drawing Sheet

DIRECT NEGATIVE

ELECTROEROSION PRINTING PLATES

TECHNICAL FIELD

This invention relates to electroerosion printing plates which may be used directly as offset printing masters, or as negatives in the production of offset printing masters.

Electroerosion printing is a recording method based on removal of a thin layer of a metal, typically aluminum, from a substrate, under the influence of applied electrical signals. Electroerosion printing is commonly used for producing markings such as letters, numbers, symbols, patterns such as circuit patterns or other legible or coded indicia. An electrical signal is applied in a predetermined pattern to the recording medium. The electrical signal erodes the metal from the surface of the recording medium due to vaporization of the metal in response to localized heating from arcing between the electrical signal applicator (stylus) and the metal coated recording medium.

Electroerosion materials and processes are useful to produce directly human readable images, but they can also be used as negatives to make offset printing masters, or used directly as offset printing masters. Therefore, electroerosion materials are generally referred to as Direct Negative/Direct Plates (DNPs). DNPs generally comprise a flexible substrate and a hard surface metal film. Substrates are generally paper, plastic, or metal on the order of 2-5 mils thickness. This substrate is coated with a hydrophobic, ink-receptive, non-electrically conductive, polymeric base coating. This is then coated with a thin metal film. The metal film is generally a vapor deposited aluminum, of a thickness on the order of 0.1 to 1.0μ. The DNP frequently also includes a top layer comprising conductive graphite particles dispersed in a hydrophilic polymeric binder.

The printing medium is utilized when a stylus, or a plurality of styli, move across the surface of the medium, which is electrically grounded. Electric writing signals are fed to the stylus to provide controlled electrical pulses which generate arcing at the surface of the recording material. This selectively heats, and causes evaporation of, the metal layer of the recording medium. The removed material corresponds to the pattern which is to be recorded. During this process, the stylus is moved in relationship to the surface of the recording medium, and in contact with the removable layer (thin film of aluminum) or with the lubricating layer placed on top of the vaporizable removable material.

Since the aluminum film is generally only 0.1 to 1.0μ thick, it is very fragile. The pressure of the stylus on the aluminum layer causes scratching and gouging, thus removing the aluminum and adversely affecting the pattern sought to be transcribed. The scratching or gouging may be attributable to any of several causes, including plastic deformation of the substrate during writing or cold-welding of the styli to the thin aluminum conductive layer.

The lubricating layer, when used, helps to prevent scratching and gouging by reducing friction between the DNP and the stylus, but still further reduction is desired. The scratching and gouging can also be reduced by increasing the strength of the bond between the aluminum and the polymeric base coat. Better adherence also allows an increase in the thickness of the aluminum layer without increasing the number and size of gouges. This increases the optical density of aluminum which produces a better contrast when used for producing offset printing plates.

When DNPs are used as negatives for the creation of offset printing plates, it is desired that the aluminum film on the DNP have an optical density of at least 3.0. Although with a little adjustment of exposure, a DNP which has an optical density within the range of 1.8-2.3 can be used for exposing conventional offset plates, for maximum life of the plate and no change in the exposures which are standard in the printing industry, the optical density of the aluminum film should be at least 3.0. The DNPs are directly competing with conventional silver halide negatives having optical densities in the ranges of 3.5-4.0, which allows production of an offset plate which can produce more copies than plates made from DNPs with low optical densities.

Further, when DNPs are used directly as offset plates, a thicker aluminum layer leads to a longer press life for the DNP. Although prior art polymer matrix compositions provide DNPs useful for direct printing of 10,000 copies or more, the optical densities (thicknesses) of the aluminum layer are still rather low. When the optical density of the aluminum is raised above about 2.4-2.5 with the prior art polymer compositions, the material becomes very susceptible to scratching and gouging, and generally unusable. A higher optical density (achieved from a thicker aluminum coating) would help to increase the press life of the DNP to 10-20,000 copies.

Further, if some DNPs (particularly polyvinylbutyral/melamine DNPs) are printed and kept at a high humidity for a few days, the imaged area begins to lose its ink receptivity (called blinding). This may be attributable to the instability of the melamine cross-linker at high humidity. The alkylated melamine formaldehyde resin could undergo hydrolysis to its hydroxy functionality under conditions of high humidity, causing a more hydrophilic and ink repellent surface. When such plates are used, lower contrast gray images are experienced. Therefore, other cross-linking agents were tested to overcome these problems.

SUMMARY OF THE INVENTION

It has been found that improved electroerosion recording media can be prepared by utilizing, on top of a polyester, paper, or metal substrate, a polyvinyl butyral polymer cross-linked with phenol-tert-butylphenol formaldehyde cross-linking agent as a base layer, and an erodible metallic layer sufficiently thin to be erodible in response to current pulses delivered by a stylus of an electroerosion printer. In a preferred embodiment, the polymeric layer further contains silica. The recording medium may also be top coated with a lubricating agent. The formulation provides excellent adhesion of the conductive layer, and allows the thickness of the metallic layer of aluminum to be increased up to 75%, resulting in an optical density (with aluminum as the metallic layer) of up to 3.5.

DETAILED DESCRIPTION OF THE INVENTION

Figure 1:
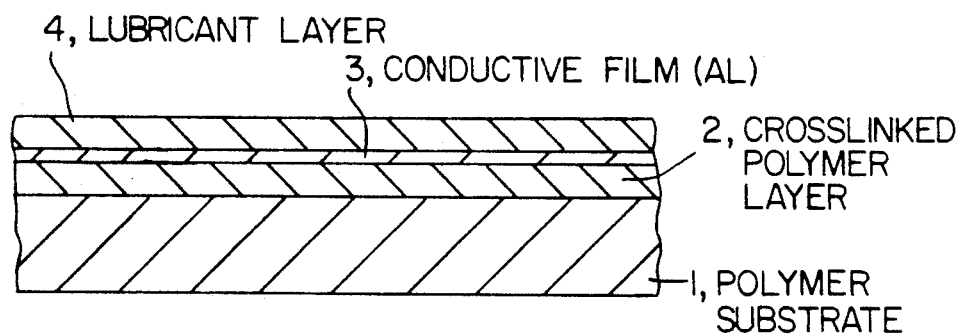
FIG. 1 is a cross-sectional view of an unprinted electroerosion recording medium in accordance with the present invention.
Figure 2:
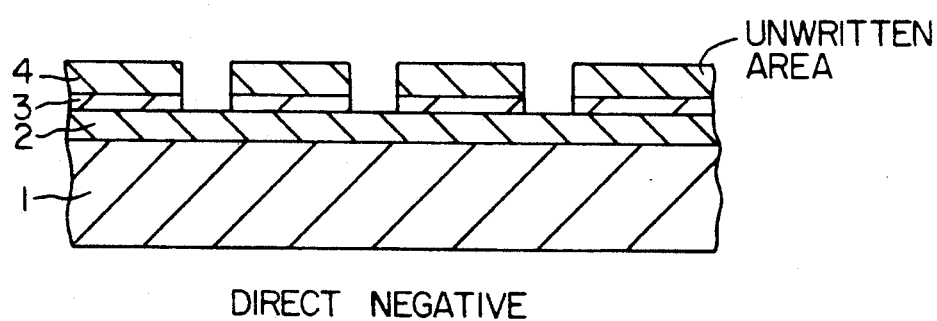
FIG. 2 is a cross-sectional view of a direct negative made from the electroerosion recording medium of the present invention.

In accordance with FIG. 1, a Direct Negative/Direct Plate electroerosion recording medium (DNP) 10 comprises a substrate 1, usually a polyester film such as polyethylene terephthalate (but occasionally metal or paper), with a 4–8μ thick coating 2 of a cross-linked polymer matrix. Polymer matrix 2 may also contain a pigment. The pigment is generally silica and serves to make the polymer matrix base layer 2 hard and rough. The dried polymer matrix/silica layer generally contains about 20–50% binder, 10–30% of a cross-linking agent, and 10–50% silica. Once this polymer/pigment layer 2 is produced, a thin (optical density of 1.9–3.5) conductive erodible metallic film 3 is vacuum deposited. The film is generally made from aluminum. Over the top of the aluminum film 3, a thin lubricating layer 4 may be applied.

The functional performance (press life, scratching, gouging, optical density, and pin-hole density) of the DNP depends, among other things, upon the thermomechanical properties of the polymer layer 2. Specifically, the adhesion of the polymer matrix layer 2 to the aluminum film 3 determines the press life of the DNP. Similarly, the population of gouges is mainly dependent upon the adhesion of the polymer matrix 2 to the polyester substrate 1, and cohesion of the pigment (silica) to the polymer matrix.

It has been found that polyvinylbutyral, a partially hydrolyzed and acetylized polyvinyl acetate, works very well as a polymer layer in that it gives good adhesion to the aluminum film when crosslinked with a cross-linking agent comprising phenol-tert-butylphenol formaldehyde. The adhesion is usually 5–10 times higher than prior art cellulosic or polyurethane polymer matrixes. Polyvinylbutyrals are widely used in industry, and there are a variety of these polymers available in the market depending on their molecular weight, degree of hydrolysis, and degree of acetalization. High molecular weight polymers are generally to be avoided because of the very high viscosity of solutions made with such polymers. This results in difficulty formulating the DNPs.

A mixed phenol-tert-butylphenol formaldehyde cross-linker was used with the polyvinylbutyral because it was found that a mixed phenol-tert-butylphenol formaldehyde forms a cross linked system with hydroxy containing resins (including polyvinylbutyral) by a substitution reaction. Since only a molecule of water is liberated during this reaction, there is very little or no shrinkage and curl in the dried film. Further, such phenolic resins possess high adhesion properties to both other polymers and metal.

PREFERRED EMBODIMENTS

Of the various polyvinylbutyrals which are available, it was found that Butvar B-98 TM, from Monsanto Industrial Chemicals Company of St. Louis, Mo., gave particularly good results. Butvar B-98 has an average molecular weight of about 30,000 and has about 20% free hydroxyl group (as measured as vinyl alcohol) which can be cross-linked with phenol-tert-butylphenol formaldehyde cross-linking agent. Butvar B-98 also gives low viscosity solutions at moderately high percent solids for ease of workability in plate formulation. The preferred mixed phenol-tert-butylphenol formaldehyde for use with polyvinyl butyral is Durite SL 3270 TM (Borden Chemical Company, Columbus Ohio). A pigment (usually silica) is dispersed in the alcohol solution of the Butvar B-98 polymer in the presence of a surfactant. Additional binder solution and the Durite SL 3270 TM phenol-tert-butylphenol formaldehyde cross-linking agent are then added and this composition is used to coat a polyester substrate to form the base layer of a DNP.

EXAMPLES

In each Example, a number of plates were produced with the compositions recited, and the plates were printed and compared. In some cases, different thicknesses of various layers were used on plates of the same composition to determine the printed quality of the plates with different optical densities of aluminum. This is shown in each Example by a range of thicknesses for the particular layer.

COMPARATIVE EXAMPLE 1

Polyvinylbutyral and Alkylated Melamine Formaldehyde

A mixture of 60 parts of 15% Butvar B-98 in a 4:1 ethyl alcohol:N-butyl alcohol, 30 parts of amorphous silica, and 0.5 parts of RE-610 TM (a phosphate acid ester surfactant available from GAF Corporation Chemical Products of New York, N.Y.) were milled to a desired level. This mill base was then mixed with additional Butvar B-98 solution and Cymel 303 TM (an alkylated melamine formaldehyde cross-linking agent available from American Cyanamid Company Plastics Division, Wayne, N.J.) in sufficient proportions such that the final dry film had 10 to 50% silica, 20–50% Butvar, and 10–30% Cymel 303. The coating fluid was coated on plastic, paper, or metal substrates to a thickness of 3–10μ and dried in an oven at 70°–150° C. A thin aluminum film (0.2–1.0μ corresponding to an optical density of 1.8–2.5) was deposited on the base layer by way of vacuum evaporation. Finally a lubricating top coat composed of graphite in an organic binder with a thickness of 2–10 μg/cm$^2$ was applied. The resulting DNPs gave about 10,000 high quality copies on the offset press before printing deteriorated.

Comparative Example 2 was used to test the effect of a small amount of partially fluorinated graphite added to the polymer layer. The example shows that the graphite fluoride helps to further improve the adhesion of the aluminum to the polymer layer, and also to reduce the number of pin holes formed in the aluminum layer. The fluorinated graphite separates and rises to the surface of the polymer layer during curing. Since the fluorinated graphite has very low conductivity, it aids in dispersing static charges, which decreases the attraction for dirt and dust which cause pin holes in the aluminum when the aluminum layer is applied. The DNPs produced were able to produce more copies than prior art cellulosic-based DNPs, but higher optical density of the aluminum layer is desirable.

COMPARATIVE EXAMPLE 2

Polyvinylbutyral and Alkylated Melamine Formaldehyde

A mixture of 60 parts 15% Butvar B-98 in a 4:1 ethyl alcohol:N-butyl alcohol solution was added to 30.0 parts of amorphous silica, 1–2 parts Accufluor CFx TM fluorinated graphite (from Allied Signal Company, Morristown, N.J.) and 0.35 parts RE-610. The mixture was milled and this mill base was then mixed with additional Butvar B-98 solution with 20-80% alkylated melamine formaldehyde (Cymel 303), along with a small amount p-toluenesulfonic acid (0.5-4% based on total resin solids). This mixture was then coated on a polyester, paper, or metal substrate to a thickness of 4-10μ and dried in an oven. After metallization and subsequent top coating with lubricant, the final DNP was used as a direct offset plate which gave 10,000 good quality copies, and the gouging problems were reduced. In addition the material had far less pin holes than that of that Example 1.

COMPARATIVE EXAMPLE 3

Polyvinylbutyral and Alkylated Melamine Formaldehyde

A DNP was prepared as in Comparative Example 2, except that Accufluor CFx was replaced by Teflon TM polytetrafluoroethylene (E. I. DuPont de Nemours & Co. Wilmington, Del.) powder. After coating, metallization, and top coating with a lubricant, the DNP had a press life of about 10,000 copies.

It was found that the optical density of the aluminum in the prior art polyvinylbutyral/melamine system shown in Comparative Examples 1-3 cannot be raised beyond about 2.3 without sacrificing print quality. Further, the plates have a relatively high curl when dried to a final product, which while not critical, is nevertheless undesirable. These are problems solved by the composition of the present invention. The use of a mixed phenol-tert-butylphenol formaldehyde cross-linking agent with polyvinylbutyral allows the optical density of the aluminum layer to be increased up to 3.5 without loss of printing clarity. The following Examples show a direct comparison among different crosslinking agents when used with polyvinylbutyral and the DNPs produced from those agents. The results are summarized at the end of the Examples.

COMPARATIVE EXAMPLE 4

Polyvinylbutyral and Polyisocyanate

A mixture of 300.0 grams Imsil A 108 silica powder and 10.0 grams Accufluor CFx 3000 TM fluorinated graphite (Allied Signal Company) in 150.0 grams of 15% Butvar B-98 solution (in 60:40 cyclohexanone-toluene), 150 grams Downol PMυ (propylene glycol mono methyl ether from Dow Chemical Company, Midland, Mich.) and two grams RE-610 surfactant were mixed with a high speed stirrer and then milled using steel shots to form a mill base. A solution of 26.0 grams polyisocyanate CB-75 TM (Mobay Chemical Corp of Pittsburgh, Pa.) in 90 grams of 4:1 methyl ethyl ketone-toluene was added to 150 grams of the above mill base and 480 grams of 15% Butvar B-98 solution (in cyclohexanone-toluene). The mixture was stirred for 30 minutes and then 0.5 grams of N,N-dimethyl ethanolamine (as catalyst) was added and the resulting mixture was coated as in Examples 5 and 6, on a PET substrate to a thickness of 5-7μ and cured at temperatures of 90°-140° C. The samples were then aluminized to optical densities of 1.8-2.5 and coated with lubricating top coat.

COMPARATIVE EXAMPLE 5

Polyvinylbutyral and Alkylated Melamine Formaldehyde

A mixture of 300.0 grams Imsil A 108 silica powder and 10.0 grams Accufluor CFx 3000 TM fluorinated graphite (Allied Signal Company) in 150.0 grams of 15% Butvar B-98 solution (in 4:1 isopropyl alcohol-toluene), 150 grams Downol PM TM (propylene glycol mono methyl ether from Dow Chemical Company, Midland, Mich.) and two grams RE-610 surfactant were mixed with a high speed stirrer and then milled using steel shots to form a mill base. Cymel 303 alkylated melamine formaldehyde (36.2 grams) was added to a mixture of 448.0 grams of 15% Butvar B-98 solution in 4:1 isopropyl alcohol-toluene and 140.0 grams of the mill base. The resulting mixture was stirred for 15 minutes. To this mixture was added a solution of 2.0 grams of p-toluenesulfonic acid in 46.0 grams isopropyl alcohol, 23.0 grams toluene and 16 grams Downol PM. The final solution was stirred for 30 minutes and coated on a PET substrate to a dry thickness of 5-7μ. The base coat was dried and cured in an oven at 90°-140° C. The base coat was then aluminized in a vacuum evaporator to optical density of 1.8-2.5. After coating a lubricating top coat containing graphite-binder-potassium chromate, the samples were tested on an electroerosion printer.

EXAMPLE 6

Polyvinylbutyral and Mixed Phenol-tert-butylphenol Formaldehyde

Durite SL 3270 TM mixed phenol-tert-butylphenol formaldehyde resin (Borden Chemical Company, Columbus, Ohio) (39.0 grams) was added to a mixture of 481.0 grams of 15% Butvar B-98 solution in 4:1 isopropyl alcohol-toluene and 150.0 grams of the mill base shown in Example 5. The resulting mixture was stirred for 15 minutes. To this mixture was added a solution of 2.0 grams of p-toluenesulfonic acid in 48.0 grams isopropyl alcohol, 24.0 grams toluene and 16 grams Downol PM. The final solution was stirred for 30 minutes and coated on a PET substrate to a dry thickness of 5-7μ. The base coat was dried and cured in an oven at 90°-140° C. The base coat was then aluminized to optical density of 1.9-3.5 then top coated with graphite-binder-potassium chromate lubricating top coat and tested on an electroerosion printer.

EXAMPLE 7

Polyvinylbutyral and Phenol-tert-butylphenol Formaldehyde

A mixture of 300.0 grams amorphous silica and 10.0 grams Accufluor CFx 3000 TM fluorinated graphite (Allied Signal Company) in 150.0 grams of 15% Butvar B-98 solution (in isopropyl alcohol and toluene) and two grams RE-610 surfactant was jar milled for 20 hours and filtered. 150.0 grams of this mixture as mixed with 480 grams of additional Butvar B-98 solution. 75 grams Durite SL 3270 resin in a mixture of isopropyl alcohol, toluene, and Downol PM TM (Dow Chemical Company, Midland, Mich.) was added, and the mixture was stirred at high shear. Finally, 1% p-toluenesulfonic acid was added as a catalyst, and the mixture was coated to a thickness of 5-8μ and dried in an oven at 100°-140° C. for a short period. The samples were then aluminized to an optical density of 2 5-3.5 and top coated with water based graphite and potassium dichromate to make the finished DNP. These DNPs had a press life between 15,000-20,000 copies with few pin holes and no gouging.

RESULTS

The samples of Comparative Examples 1-3 and 5, which contained alkylated melamine formaldehyde as the crosslinking agent for the polymer base coat could be aluminized to optical density of 2.3 until printing deteriorated. Scratching and gouging was very low up to that optical density, but the press life was between 5,000 and 10,000 copies. The final product sometimes had unacceptable curl. Occasionally, upon exposure to high humidity, ink receptivity of the printed plate degraded as the hydrophobicity of the polymer base coat decreased (blinding occurred).

The samples from Comparative Example 4 which contained polyisocyanate as the crosslinking agent for the polymer base coat could be aluminized to a maximum optical density of 2.4 before printing deteriorated and had a press life of only 3,000-5,000 copies. The samples had very low adhesion of the polymer base coat to the PET substrate which resulted in an unacceptable number of gouges during electroerosion printing.

The samples from Examples 6 and 7 which contained mixed phenol-tert-butylphenol formaldehyde as the crosslinking agent for the polymer base coat in accordance with the present invention could be aluminized to optical density of 3.5 and had a press life of 15,000-20,000 copies. There were no gouges and scratching was very low. Blinding was eliminated and the DNPs were flat (no curling of the finished DNP occurred).

Tests on the new DNP with a polyvinylbutyral/-phenol-tert-butylphenol formaldehyde polymer matrix showed that aluminum adhesion to the polymer coating was almost ten times better than that of melamine cross-linked polymer coatings. The tests also revealed that the thickness of the aluminum can be increased up to 75% (to an optical density of 3.5) without any adverse affect on the writing quality. Further, samples with optical density of 3.0 had even better dot shapes and uniformity than standard samples of melamine cross-linked polymer coated DNPs. The increase in the optical density of the aluminum film resulted in a substantial increase in the press life of the DNP. Finally, due to the hydrolytic stability of the cross-linked mixed phenol-tert-butylphenol formaldehyde liquid resin formulation, the DNPs prepared from the formulation of the present invention did not encounter the ink receptivity loss (blinding) experienced by the melamine cross-linked polymers of Comparative Examples 1-3 and 5 when stored at high humidity for a few days.

It is understood that various other modifications will be apparent to one skilled in the art without departing from the spirit and scope of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An electroerosion recording medium comprising:
   a substrate;
   a cross-linked polymeric layer disposed on said substrate; and
   a conductive, erodible metallic layer disposed on said polymeric layer, said metallic layer being sufficiently thin to be eroded when subjected to current pulses from recording styli during electroerosion recording;
   wherein said cross-linked polymeric layer comprises polyvinylbutyral crosslinked with a mixed phenol-tert-butylphenol formaldehyde cross-linking agent.

2. The medium of claim 1 wherein said erodible metallic layer has an optical density between 2.5 and 3.5.

3. The medium of claim 1 wherein said crosslinked polymeric layer further comprises a pigment.

4. The medium of claim 3 wherein said medium further comprises a layer of a lubricating material applied over said erodible layer.

5. The medium of claim 4 wherein said pigment is silica.

6. The medium of claim 5 wherein said erodible metallic layer is aluminum.

7. An electroerosion recording medium comprising:
   a substrate;
   a cross-linked polymeric layer disposed on said substrate; and
   a conductive, erodible metallic layer disposed on said polymeric layer, said metallic layer being sufficiently thin to be eroded when subjected to current pulses from recording styli during electroerosion recording;
   wherein said cross-linked polymeric layer comprises 20-50% polyvinylbutyral crosslinked with 10-30% of a mixed phenol-tert-butylphenol formaldehyde cross-linking agent, and 10-50% pigment.

8. The medium of claim 7 wherein said erodible metallic layer has an optical density between 2.5 and 3.5.

9. The medium of claim 7 wherein said medium further comprises a layer of a lubricating material applied over said erodible layer.

10. The medium of claim 9 wherein said pigment is silica.

11. An electroerosion recording medium comprising:
    a substrate formed from polyethylene terephthalate;
    a cross-linked polymeric layer disposed on said substrate; and
    a conductive, erodible aluminum layer disposed on said polymeric layer, said aluminum layer being sufficiently thin to be eroded when subjected to current pulses from recording styli during electroerosion recording, and having an optical density between 2.5 and 3.5;
    wherein said cross-linked polymeric layer comprises 20-50% polyvinylbutyral crosslinked with 10-30% of a mixed phenol-tert-butylphenol formaldehyde cross-linking agent, and 10-50% silica pigment.

* * * * *